United States Patent [19]

Yoshii et al.

[11] Patent Number: 5,018,780
[45] Date of Patent: May 28, 1991

[54] VEHICLE LOWER BODY STRUCTURE

[75] Inventors: Noboru Yoshii; Takashi Umeda, both of Hiroshima, Japan

[73] Assignee: Mazda Motor Corporation, Hiroshima, Japan

[21] Appl. No.: 456,607

[22] Filed: Dec. 27, 1989

Related U.S. Application Data

[63] Continuation of Ser. No. 227,462, Aug. 2, 1988, abandoned, which is a continuation of Ser. No. 913,370, Sep. 30, 1986, abandoned.

[30] Foreign Application Priority Data

| Oct. 1, 1985 | [JP] | Japan | 60-150453[U] |
| Oct. 4, 1985 | [JP] | Japan | 60-153057[U] |
| Oct. 7, 1985 | [JP] | Japan | 60-153572[U] |
| Oct. 14, 1985 | [JP] | Japan | 60-228499 |

[51] Int. Cl.⁵ .......................................... B62D 23/00
[52] U.S. Cl. ................................... 296/203; 296/186; 296/195; 296/204; 296/30
[58] Field of Search ................. 296/30, 186, 187, 195, 296/198, 203, 204, 209; 280/808, 780

[56] References Cited

U.S. PATENT DOCUMENTS

| 2,662,793 | 12/1953 | Lindsay | 296/195 |
| 2,921,812 | 1/1960 | Barenyi | 296/196 |
| 3,423,122 | 1/1969 | Wessells, III | 296/203 X |
| 4,231,592 | 11/1980 | Scherenberg et al. | 280/808 |
| 4,402,545 | 9/1983 | Utsunomiya et al. | 296/204 |
| 4,457,555 | 7/1984 | Draper | 296/186 |
| 4,516,803 | 5/1985 | Kaltz et al. | 296/195 X |
| 4,557,502 | 12/1985 | Scaduto et al. | 296/186 X |

FOREIGN PATENT DOCUMENTS

| 55-94280 | 6/1980 | Japan . |
| 34570 | 4/1981 | Japan | 296/195 |
| 58-79456 | 5/1983 | Japan . |
| 59-133378 | 9/1984 | Japan . |
| 927275 | 5/1963 | United Kingdom | 296/204 |

Primary Examiner—Dennis H. Pedder
Attorney, Agent, or Firm—Fleit, Jacobson, Cohn, Price, Holman & Stern

[57] ABSTRACT

A vehicle rear body structure having a side sill structure of closed cross section extending substantially along the opposite sides of the floor panel and a transversely extending cross structure of closed cross section. The cross structure is connected with the floor panel and the side sill structure. The cross structure has a portion higher than the side sill structure and connected with the rear side panel of the vehicle body.

18 Claims, 6 Drawing Sheets

VEHICLE LOWER BODY STRUCTURE

This application is a continuation of application Ser. No. 07/227,462, filed Aug. 2, 1988, now abandoned, which is a continuation of application Ser. No. 06/913,370, filed Sept. 30, 1986 now abandoned.

BACKGROUND OF THE INVENTION

1. Field of the Invention

The present invention relates to a vehicle body and more particularly to a vehicle lower body structure. More specifically, the present invention pertains to a reinforcement structure of a vehicle rear lower body.

2. Description of the Prior Art

Conventional motor vehicle body structures have side sills of a closed cross section extending along the opposite sides of a floor panel. At the rear portion, there is a cross member extending transversely and connected with the floor panel to form a structure of a closed cross section. The cross member is connected at the opposite ends to the respective side sills. In the Japanese utility model application No. 53-180904 filed on Dec. 25, 1978 and published for public inspection on June 30, 1980 under the disclosure No. 55-94280, there is proposed to provide a cross member of an increased heightwise dimension so that it extends upwards at the opposite ends beyond the upper edges of the side sills. The purpose of this cross member structure is to make it possible to block the side door against coming into the passanger compartment in case of a sideward collision of the vehicle.

Conventional rear lower body structures are considered as providing a satisfactory rigidity as long as the vehicle body has a rigid roof structure. It should however be noted that in case of a convertible or open top vehicle, the roof structure does not contribute to the rigidity of the body structure so that the cross member cannot provide a sufficient torsional rigidity. Even in the body structure as proposed by the aforementioned Japanese utility model, the cross does not contribute to the torsional rigidity to a satisfactory level because the cross member is connected at the opposite ends only to the side sills.

SUMMARY OF THE INVENTION

It is an object of the present invention to provide a vehicle rear lower structure which can provide an increased torsional and sideward rigidity.

Another object of the present invention is to provide a vehicle lower body structure which is suitable particularly to a convertible or an open top vehicle body.

Still further object of the present invention is to provide a vehicle body structure having a rigid structure for attaching a seat belt anchor.

A further object of the present invention is to provide a vehicle rear body structure having suitable means for storing a spare tire.

According to the present invention, the above and other objects can be accomplished by a vehicle rear body structure including a floor panel, a pair of side sills extending along and connected to the opposite sides of the floor panel, a pair of rear body panels extending substantially vertically from the opposite sides of the floor panel, a transversely extending cross structure of a closed cross section which has a portion extending upwards beyond the side sills and is connected at the opposite ends to said side sills and said rear body panels.

According to a preferable aspect of the present invention, the cross structure includes a first cross member extending transversely and connected with the floor panel to form a first structure of closed cross section and a second cross member extending transversely and connected with at least one of the floor panel and the first cross member to form a second structure of closed cross section so that two juxtaposed structures of closed cross section are formed.

The rear body panel may be formed at a front edge portion with a pillar structure defining a rear edge of the door opening and the cross structure may be connected with the pillar structure. Rearwards the pillar structure, the rear body structure may be formed with a tire house for providing a space for a rear wheel and the cross structure may further be connected with the tire house. A second cross structure may be provided rearwards the first mentioned cross structure and connected with the floor panel, a connecting member being provided between the first and second cross structures to provide a spare tire holder.

The above and other objects of the present invention will become apparent from the following descriptions of a preferred embodiment taking reference to the accompanying drawings.

DESCRIPTION OF THE PREFERRED EMBODIMENT

Figure 1:
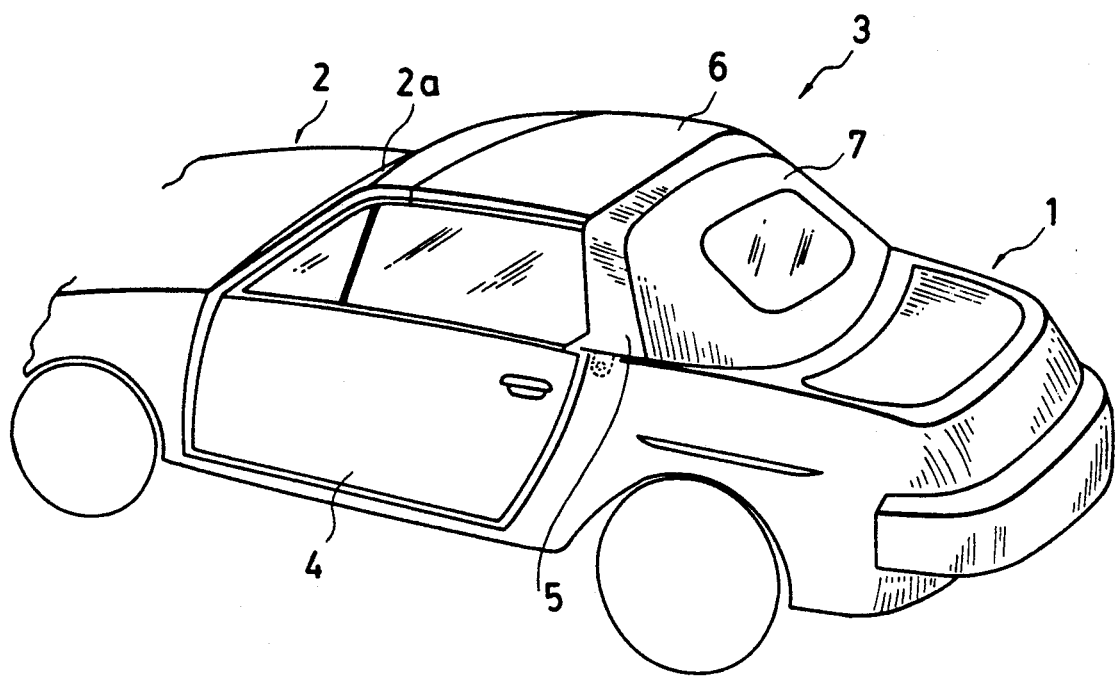
FIG. 1 is a perspective view of a convertible type vehicle in which the present invention is embodied.
Figure 2:
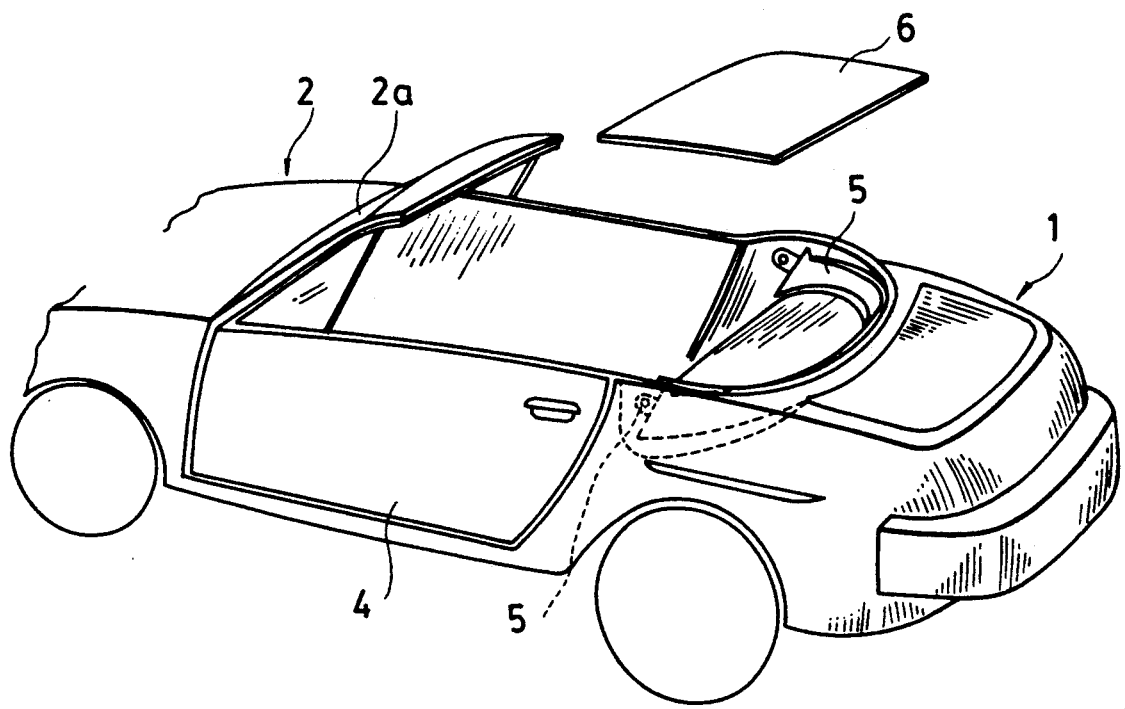
FIG. 2 is a perspective view of the vehicle shown in FIG. 1 with the roof folded to open the top of the vehicle body.

Referring to the drawings, particularly to FIG. 1, there is shown a convertible type vehicle body including a rear body section 1, a front body section 2, a retractable roof structure 3 and a pair of side doors 4. The front body section 2 includes a front windshield structure 2a. The roof structure 3 includes an inverted U-shaped swingable pillar 5, a rigid roof panel 6 and a foldable hood 7. The swingable pillar 5 is connected with the rear body section 1 for swingable movement between an upright position shown in FIG. 1 and a retracted position shown in FIG. 2. With the swingable pillar 5 in the upright position, the roof panel 6 is placed to extend between the upper edge of the front windshield structure 2a and the swingable pillar 5. As shown in FIG. 2, the roof panel 6 can be removed from the front windshield structure 2a and the swingable pillar 5 and the swingable pillar 5 is swingably retracted into the rear body section 1. At this instance, the hood 7 is folded as shown in FIG. 2.

Figure 3:
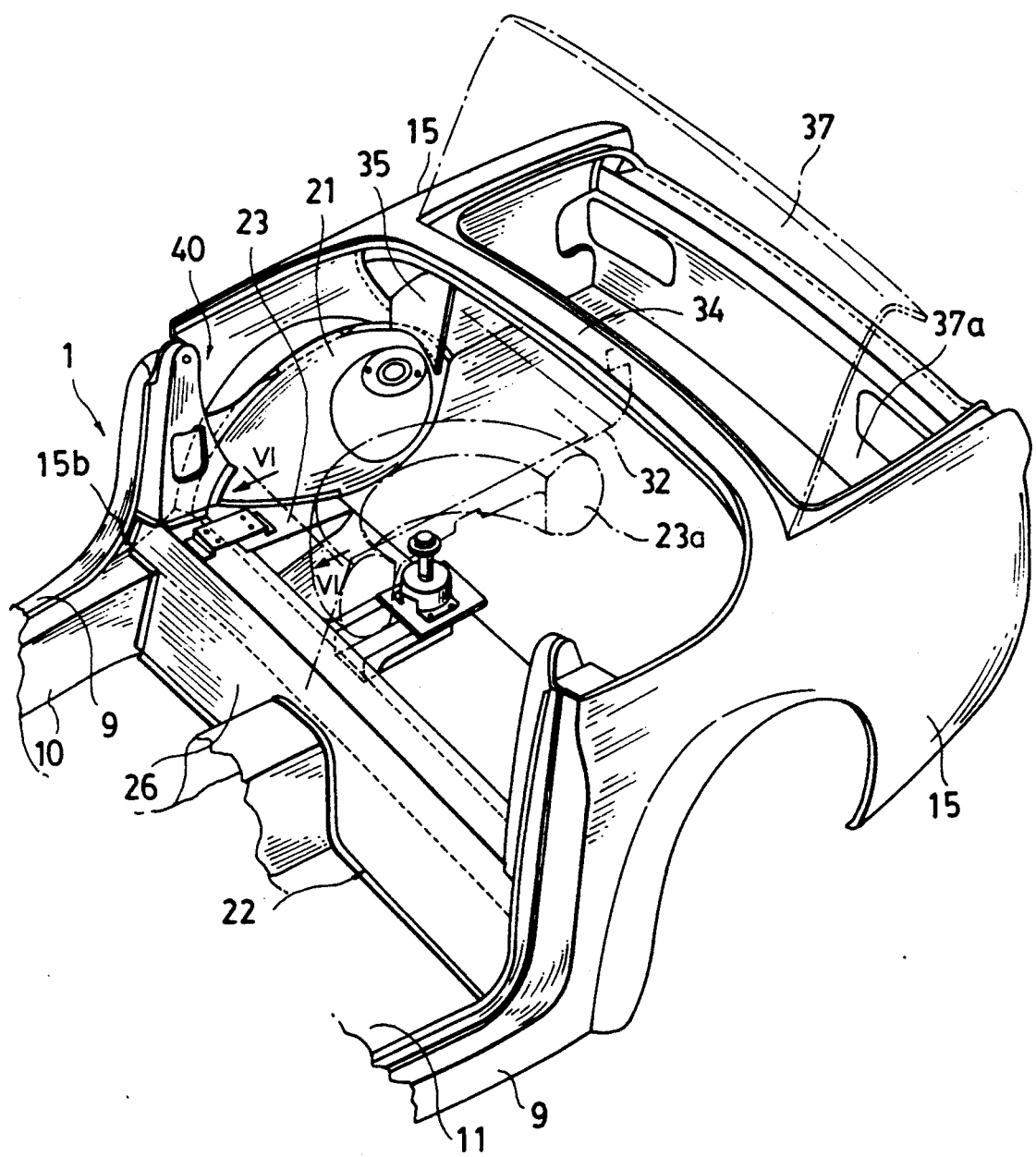
FIG. 3 is a perspective view of the vehicle rear body section particularly showing the embodiment of the present invention.
Figure 5:
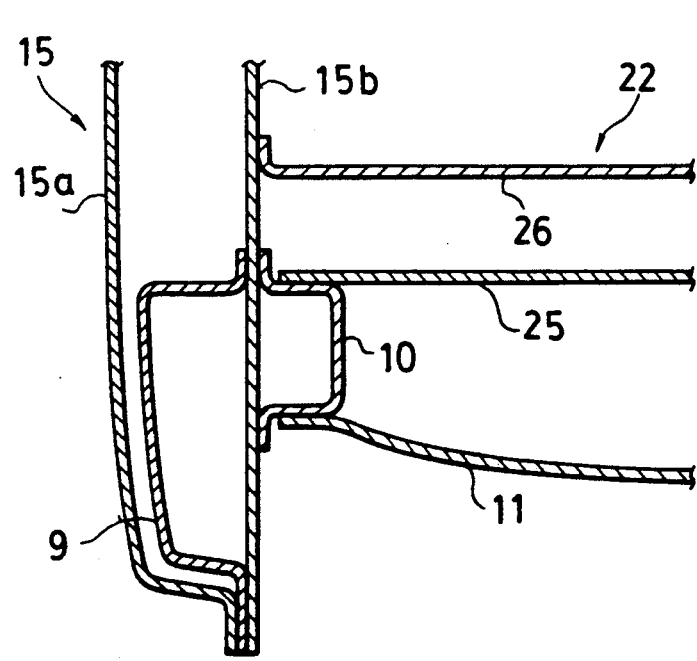
FIG. 5 is a sectional view taken substantially along the line V—V in FIG. 4.

Referring now to FIG. 3, there is shown details of the rear body section 1. As shown, the rear body section 1 includes a floor panel 11 and a pair of side panel assemblies 15 which are located along the opposite sides of the floor panel 11. As shown in FIG. 5, the side panel assembly 15 is constituted by an outer panel 15a and an inner panel 15b which are connected together to form a structure of closed cross section. A side sill 9 is provided along each side of the floor panel and connected to the inner panel 15b of the side panel assembly 15 to form a structure of closed cross section. The side panel assemblies and side sill structures together define respective side structures of the vehicle body. Along the transversely inner side of the inner panel of the side panel assembly 15, there is a side frame 10 defining a lower edge of a door opening which is also connected to the inner panel 15b to form a structure of closed cross section.

Figure 4:
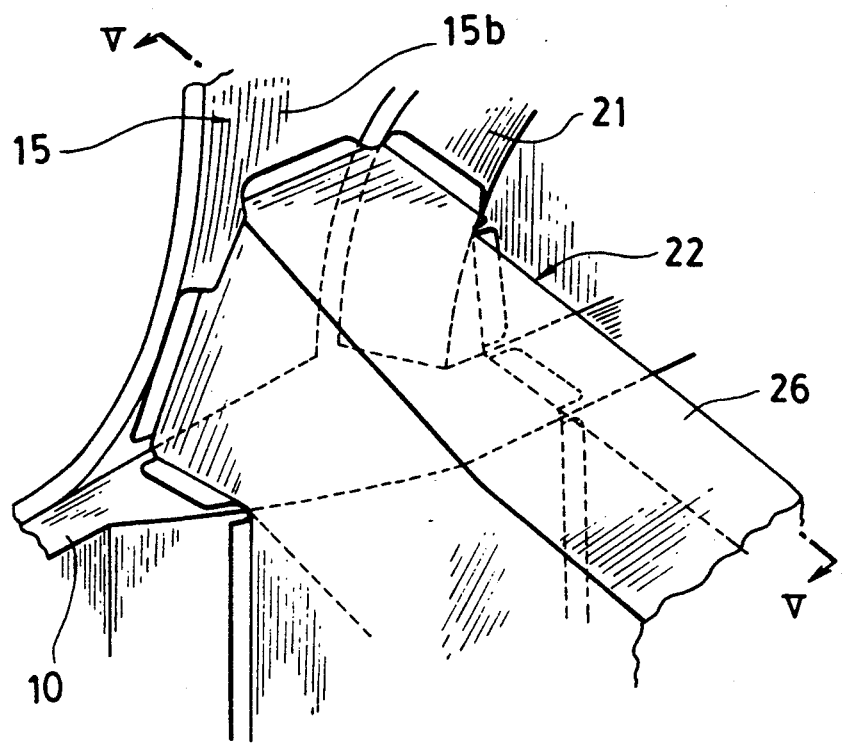
FIG. 4 is a fragmentary perspective view showing the connection of the cross structure and the rear body side structure.
Figure 6:
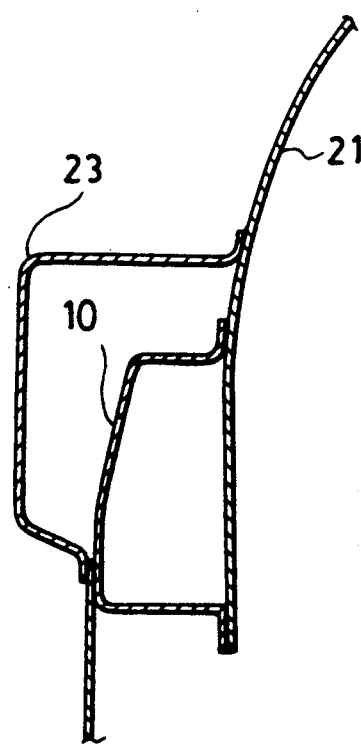
FIG. 6 is a sectional view taken substantially along the line VI—VI in FIG. 3.

Referring to FIGS. 4 and 6, it will be noted that a tire house 21 is connected to the inner panel 15b of the side panel assembly 15 to provide a space for a rear wheel (not shown) and the aforementioned side frame 10 is connected with the tire house 21 to form a structure of a closed cross section.

Figure 7:
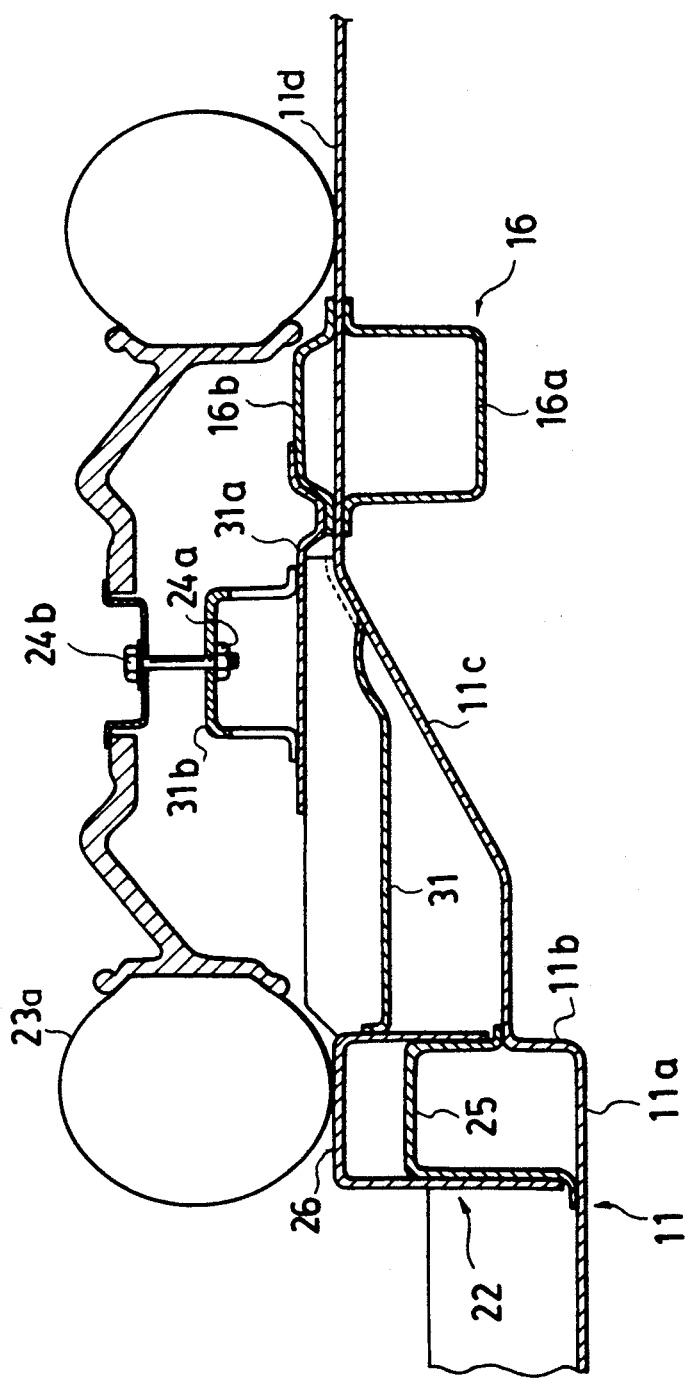
FIG. 7 is a sectional view showing the spare tire holding structure.

Referring further to FIGS. 3 through 5 and 7, a cross frame structure 22 is provided to extend transversely above the floor panel 11. The cross frame structure 22 is constituted by a lower cross member 25 and an upper cross member 26. As shown in FIG. 7, the floor panel 11 has a front portion 11a which continues at the rear end to an upright vertical portion 11b which in turn continues through a slanted portion 11c to a substantially horizontal rear portion 11d. The lower cross member 25 is of a hat-shaped cross-sectional configuration having a front lower edge connected with the front portion 11a of the floor panel 11 and a rear lower edge connected with the front end of the slanted portion 11c of the floor panel 11. The upper cross member 26 is of an inverted U-shaped cross-sectional configuration and placed over the lower cross member 25. The upper cross member 26 has leg portions connected to the lower cross member 25 to form an upper cross structure of a closed cross section. The lower cross member 25 forms a lower cross structure of a closed cross section together with the floor panel 11. As shown in FIG. 5, the floor panel 11 is connected at the opposite side edges with the lower surfaces of the side frames 10. The lower cross member 25 is of a height substantially the same as the height of the side sill 9. In other words, the lower cross member 25 has an upper surface substantially flush with the upper surface of the side sill 9. The lower cross member 25 is connected at the opposite ends with the side members 10.

In FIGS. 4 and 5, it will be noted that the upper cross member 26 is located to protrude upward beyond the upper surface of the side sill 9. The upper cross member 26 is connected at the opposite ends with the inner panel 15b of the side panel assembly 15, the tire house 21 and the side frame 10. Speaking more specifically, at each end, the upper cross member 26 is connected with the inner panel 15b of the side panel assembly 15 at the upper front portion, with the tire house 21 at the upper rear portion and with the side frame 10 at the lower portion. The cross structure 22 constituted by the cross members 25 and 26 and the connection of the upper cross member 26 with the side inner panel 15b, the tire house 21 and the side frame 10 provide an increased sideward rigidity as well as a torsional rigidity so that a satisfactory torsional rigidity can be provided even in an open-top vehicle body. At each end of the cross structure 22, there is provided a rear side frame 23 (one shown in FIGS. 3 and 6) which extends along the adjacent side of the slanted portion 11c of the floor panel 11 between the cross structure 22 and the rear portion 11d of the floor panel 11. Each rear side frame 23 is connected with the upper cross member 26, the adjacent tire house 21 and the adjacent side member 10 as shown in FIGS. 3 and 6 to form a structure of closed cross section which provides an additional rigidity.

Referring to FIG. 3, the rear body section has a rear deck 34 which extends transversely between the upper edges of the side panel assemblies 15 and a trunk lid 37 is provided to close the upper opening of a trunk compartment 37a. At each end of the rear deck 34, a reinforcement 35 is provided to reinforce the connection of the rear deck 34 by connecting the rear deck 34 to the tire house 21.

As shown in FIG. 7, a second cross structure 16 is provided on the rear portion 11d of the floor panel 11. The second cross structure 16 is constituted by a lower cross member 16a of an U-shaped cross-section which is located beneath the rear floor portion 11d and connected at the upper edges with the lower surface of the rear portion 11d of the floor panel 11 to provide a lower structure of a closed cross-section. The second cross structure 16 further includes an upper cross member 16b which is of a dish-shaped cross-section and connected to the upper surface of the rear floor portion 11d to provide an upper structure of a closed cross section. A connecting member 31 is provided to extend longitudinally between the upper cross member 26 and the rear floor portion 11d and welded at the front end to the upper cross member 26 and at the rear end to the portions 11c and 11d of the floor panel 11 and the upper cross member 16b. A gusset plate 31a is laid over the connecting member 31 and the upper cross member 16b to reinforce the connection between the connecting member 31 and the second cross structure 16.

The connecting member 31 is of an inverted hat-shaped cross-section and provides an additional rigidity together with the second cross structure 16. On the connecting member 31, there is provided a spare tire retaining bracket 31b which has a nut 24a. A spare tire 23a is placed on the connecting member 31 and held in position by a bolt 24b which is engaged with the nut 24a in the bracket 31b. A spare tire cover 32 is provided to cover the spare tire 23.

Figure 9:
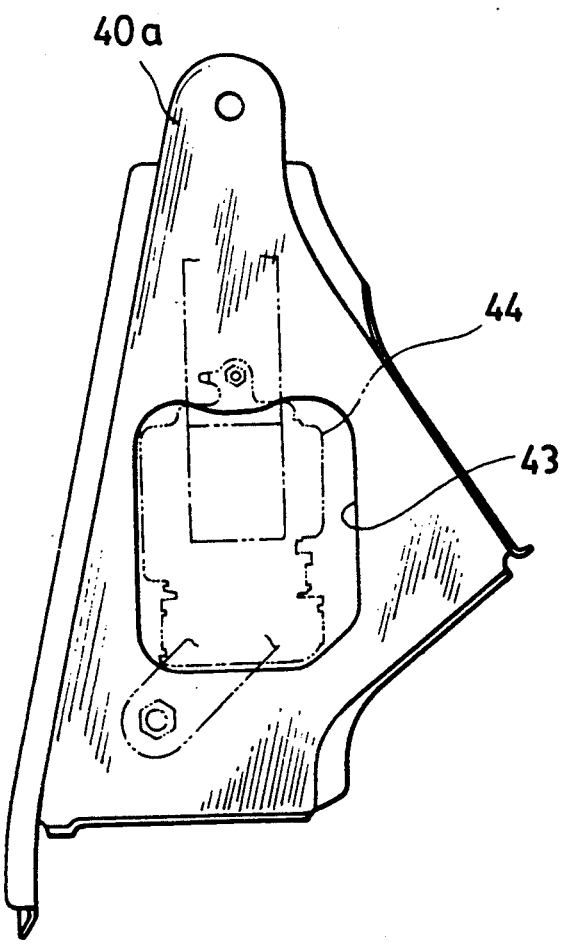
FIG. 9 is a side view of the rear pillar structure showing the location of the safety belt retractor.
Figure 10:
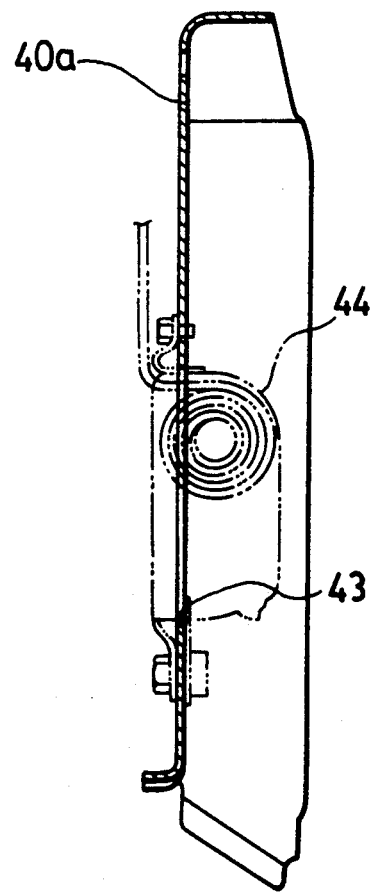
FIG. 10 is a sectional view of the rear pillar structure showing the arrangement of the safety belt retractor.
Figure 11:
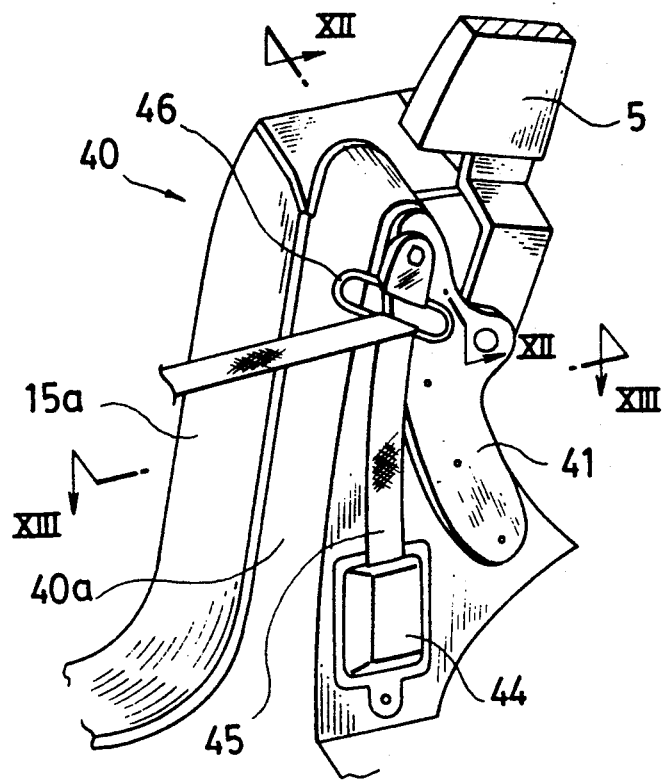
FIG. 11 is a fragmentary perspective view showing the safety belt arrangement.
Figure 12:
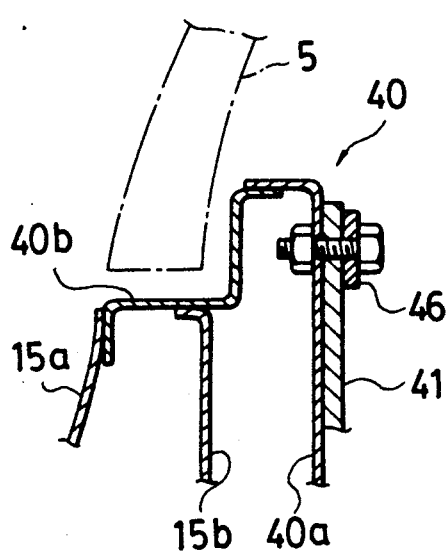
FIG. 12 is a sectional view of the upper portion of the rear pillar structure taken along the line XII—XII in FIG. 11; and, FIG. 13 is a sectional view taken substantially along the line XIII—XIII in FIG. 11.
Figure 13:
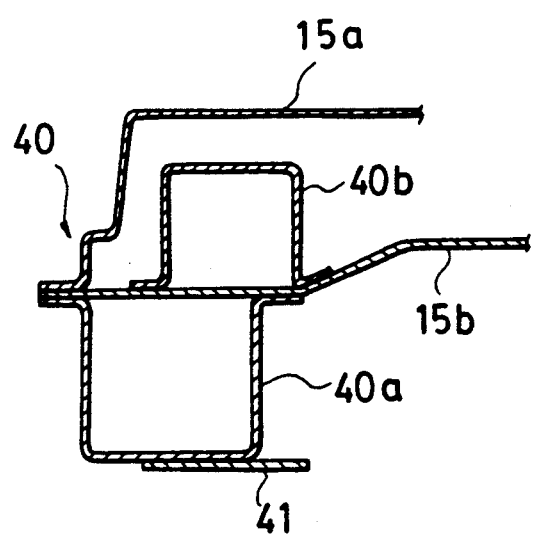

Referring now to FIGS. 8 through 13, it will be noted that there is provided a pillar structure 40. The pillar structure 40 is constituted partly by the side outer panel 15a and the side inner panel 15b. An inner reinforcement or inner pillar member 40a is provided at the inner side of the side inner panel 15b. As shown in FIG. 13, the inner reinforcement 40a is of a channel-shaped cross-section and connected at the opposite side edges to the inner side panel 15b. At the lower edge, the inner reinforcement 40a is connected with the tire house 21 and the upper cross member 26 of the cross structure 22. At the upper end, there is a top cover 40b which connects the upper edges of the side outer panel 15a, the side inner panel 15b and the inner reinforcement 40a as shown in FIG. 12. A second reinforcememnt 40b is provided at the outer side of the side inner panel 15b. The reinforcement 40b is of a channel-shaped cross-section and connected to the outer surface of the side inner panel 15b. A bracket 41 is connected to the inner reinforcement 40a. The bracket 41 supports the lower end of the swingable pillar 5 for swinging movements as shown in FIG. 11.

Figure 8:
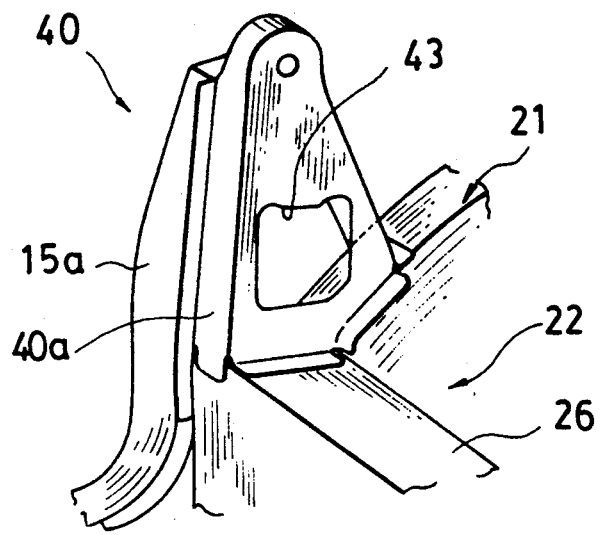
FIG. 8 is a fragmentary perspective view showing the details of the rear pillar structure.

Referring to FIGS. 8 through 10, it will be noted that the inner reinforcement 40a is formed with an opening 43 and a seat belt retractor 44 is mounted on the reinforcement 40a at the opening 43. A seat belt 45 extends from the retractor 44 and is passed through a ring 46 provided on the bracket 41. It should be noted that the pillar structure 40 provides a sufficient rigidity for supporting the swingable pillar 5 and the seat belt retractor 44.

The invention has thus been shown and described with reference to a specific embodiment, however, it should be noted that the invention is in no way limited to the details of the illustrated structures but changes and modifications may be made without departing from the scope of the appended claims.

We claim:

1. An elongated open-top vehicle body structure comprising a front body section having a forward end and a rear end, a rear body section having a forward end, a rear end and two opposed sides in each of which a side door opening is defined, the forward end of said rear body section being connected to the rear end of the front body section and a side door mounted on each opposed side of said rear body section to open and close the side door openings, said rear body section comprising:
   (a) a floor panel horizontally extending forwardly and rearwardly between the forward end and the rear end of said rear body section and transversely between the opposed sides thereof;
   (b) each said opposed side of said rear body section extending along and connected to one side of the floor panel and being composed of a vertically extending first portion constituting a side sill defining the bottom of the respective side door opening and a second portion constituting a rear body panel defining the rear edge of the side door opening and extending rearwardly of the side door opening; and
   (c) a transversely extending reinforcing means of inverted U-shaped configuration extending transversely across said rear body section for reinforcing the vehicle body structure, said transversely extending reinforcing means having a lower inverted U-shaped member connected to said floor panel at its bottom and connected at its opposite ends to said vertically extending first portions of the opposed sides of said rear body section substantially flush with the tops of said side sills and rearwardly of the rear edges of the side door openings, and an upper inverted U-shaped member mounted on and extending vertically above the lower inverted U-shaped member and the side sills, the upper inverted U-shaped member overlapping and connected to the lower inverted U-shaped member and the vertically extending first portions of the opposed sides of the rear body section, and secured to the rear body panels above said side sills so that the vehicle body structure is thereby characterized by substantial torsional and sideways rigidity.

2. An elongated vehicle body structure in accordance with claim 1 in which said floor panel includes a substantially horizontal front portion and a substantially horizontal rear portion interconnected by an intermediate slanted portion that inclines upwardly and rearwardly.

3. An elongated vehicle body structure in accordance with claim 2 which includes a second transversely extending reinforcing structure extending transversely across and connected to the rear portion of the floor panel.

4. An elongated vehicle body structure in accordance with claim 3 which includes a longitudinally extending reinforcing connecting member interconnecting said second structure and said transversely extending reinforcing means and being connected to said floor panel, said longitudinally extending reinforcing connecting member including support means for supporting a spare tire.

5. An elongated vehicle body structure in accordance with claim 2 in which a rear side frame is provided on each side of the slanted portion of the floor panel, each rear side frame being connected to the transversely extending reinforcing means.

6. An elongated vehicle body structure in accordance with claim 1 in which pillar means are provided at each side of the rear body section for reinforcing the rear body section, each said pillar means including an inner pillar member connected with said rear body panel to form a structure of closed cross section, and connected at a lower end with the top of the transversely extending reinforcing means.

7. An elongated vehicle body structure in accordance with claim 6 in which a seat belt retractor is mounted on the pillar means.

8. An elongated vehicle body structure in accordance with claim 6 which includes an arch shaped swingable pillar structure having opposite leg portions, each said leg portion being pivotably connected with one of said pillar means for retractably supporting at least a part of a roof structure.

9. An elongated vehicle body structure in accordance with claim 8 in which each said pillar means includes a bracket for pivotally mounting the swingable pillar structure.

10. An elongated open-top vehicle body structure comprising a front body section having a forward end and a rear end, a rear body section having a forward end, a rear end and two opposed sides in each of which a side door opening is defined, the forward end of said rear body section being connected to the rear end of the front body section and a side door mounted on each opposed side of said rear body section to open and close the side door openings, said rear body section comprising:
   (a) a floor panel horizontally extending forwardly and rearwardly between the forward end and the rear end of said rear body section and transversely between the opposed sides thereof;
   (b) each side opposed side of said rear body section extending along and connected to one side of the floor panel and being composed of a vertically extending first portion constituting a side sill defining the bottom of the respective side door opening and a second portion constituting a rear body panel defining the rear edge of the side door opening and a rear wheel housing extending vertically and rearwardly of the side door opening; and (c) a transversely extending reinforcing means of inverted U-shaped configuration extending transversely across said rear body section for reinforcing the vehicle body structure, said transversely extending reinforcing means having a lower inverted U-shaped member connected to said floor panel at its bottom and connected at its opposite ends to said vertically extending first portions of the opposed sides of said rear body section substantially flush with the tops of said side sills and rearwardly of the rear edges of the side door openings, and an upper inverted U-shaped member mounted on and extending vertically above the lower inverted U-shaped member and the side sills, the upper inverted U-shaped member overlapping and connected to the lower inverted U-shaped member and the vertically extending first portions of the opposed sides of the rear body section, and secured to the rear body panels above said side sills and to the rear wheel housings of the rear body panels so that the vehicle body structure is thereby characterized by substantial torsional and sideways rigidity.

11. An elongated vehicle body structure in accordance with claim 10 in which said floor panel includes a substantially horizontal front portion and a substantially horizontal rear portion interconnected by an intermediate slanted portion that inclines upwardly and rearwardly.

12. An elongated vehicle body structure in accordance with claim 11 which includes a second transversely extending reinforcing structure transversely extending across and connected to the rear portion of the floor panel.

13. An elongated vehicle body structure in accordance with claim 12 which includes a longitudinally extending reinforcing connecting member interconnecting said second structure and said transversely extending reinforcing means and being connected to said floor panel, said longitudinally extending reinforcing connecting member including support means for supporting a spare tire.

14. An elongated vehicle body structure in accordance with claim 11 in which a rear side frame is provided on each side of the slanted portion of the floor panel, each rear side frame being connected to the transversely extending reinforcing means.

15. An elongated vehicle body structure in accordance with claim 10 in which pillar means are provided at each side of the rear body section for reinforcing the rear body section, each said pillar means including an inner pillar member connected with said rear body panel to form a structure of closed cross section, and connected at a lower end with the top of the transversely extending reinforcing means.

16. An elongated vehicle body structure in accordance with claim 15 in which a seat belt retractor is mounted on the pillar means.

17. An elongated vehicle body structure in accordance with claim 15 which includes an arch shaped swingable pillar structure having opposite leg portions, each said leg portion being pivotably connected with one of said pillar means for retractably supporting at least a part of a roof structure.

18. An elongated vehicle body structure in accordance with claim 17 in which each said pillar means includes a bracket for pivotally mounting the swingable pillar structure.

* * * * *